United States Patent Office 2,708,045
Patented May 10, 1955

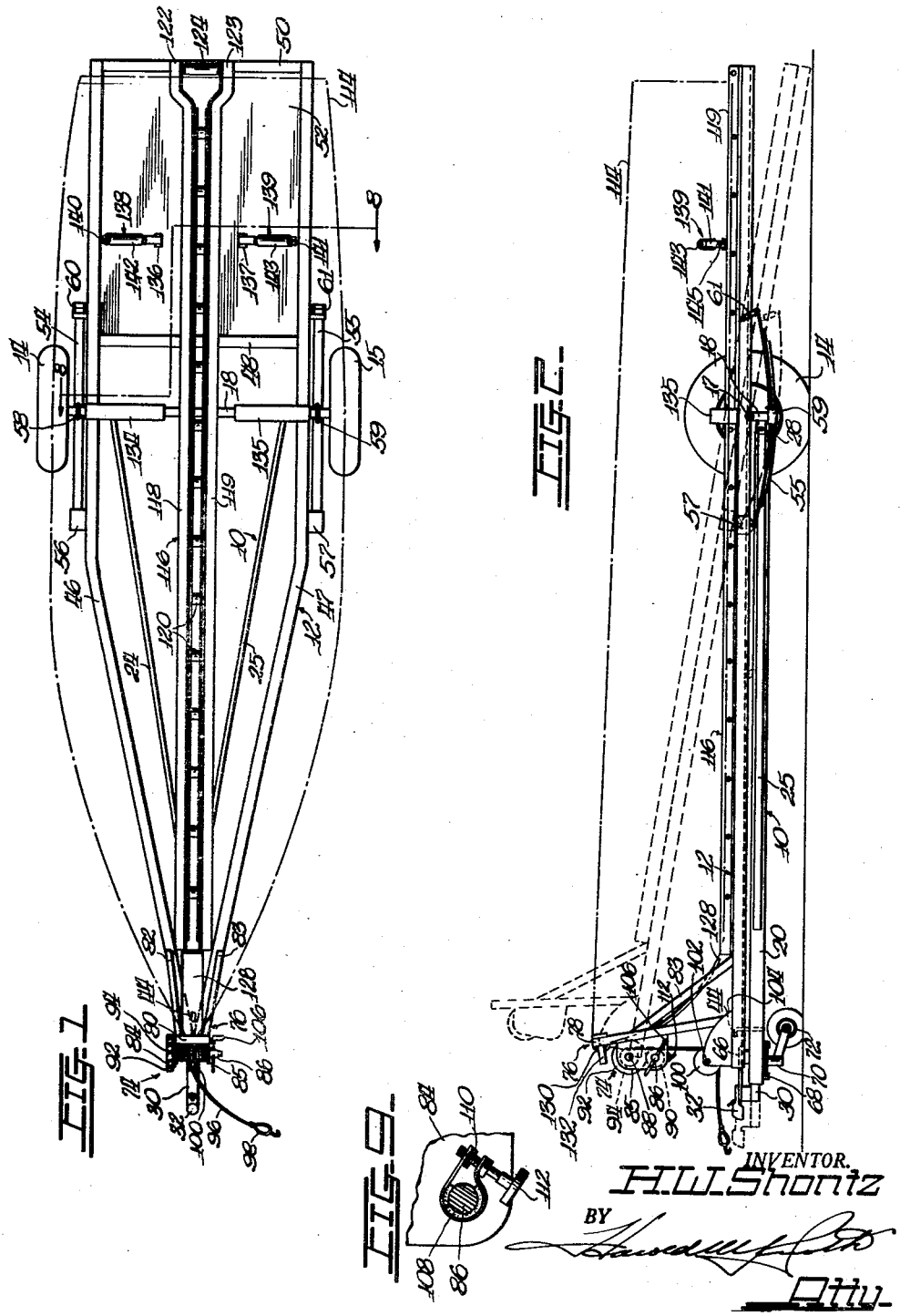

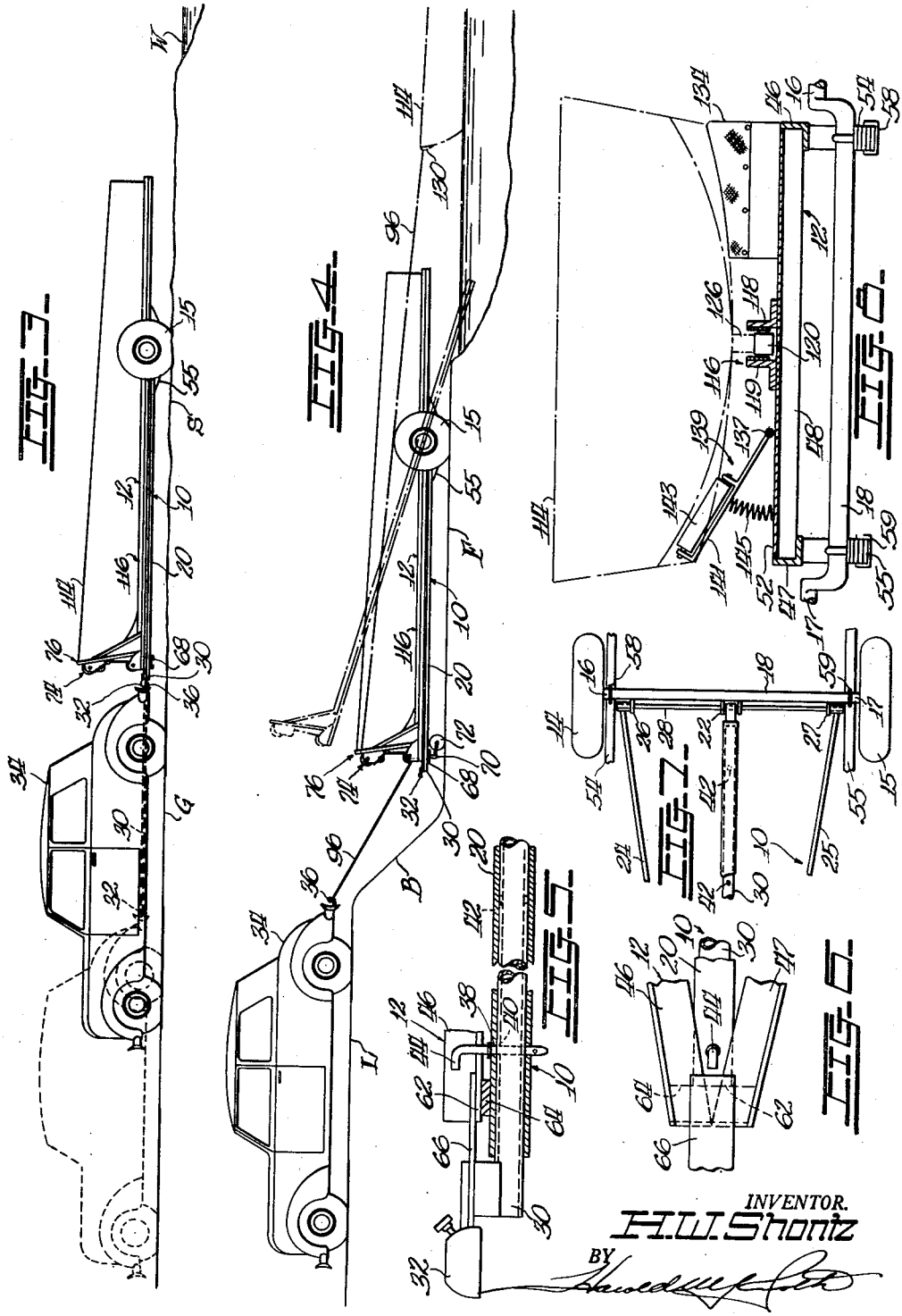

2,708,045

BOAT TRAILER

Harry W. Shontz, Davenport, Iowa

Application May 4, 1953, Serial No. 352,777

11 Claims. (Cl. 214—506)

This invention relates to a trailer and more particularly to a trailer for carrying and launching boats.

Although boat trailers as such are not new, being almost a necessity to the sportsman, few if any trailers have sufficient maneuverability in proportion to size to permit the handling of other than relatively small boats. Moreover, known trailers are limited in use because the design thereof is such that they can reach out to the water but little farther than the towing vehicle.

According to the present invention, a universal trailer is designed; one that incorporates a novel hitch structure in combination with a winch and launching body or frame, and one that can be easily maneuvered by one man in those relatively otherwise inaccessible places to which the towing vehicle cannot be driven. It is an object of the invention to equip the trailer with an extensible or telescopic hitch so that the trailer can be let out considerably over its transport length, whereby, when the towing vehicle and trailer are backed to about the limit of the towing vehicle, the hitch may be extended to back the trailer still farther. It is another object of the invention to provide the extensible hitch with a releasable lock and to combine this lock with a tilting body so that when the lock is released, the body can be tilted to facilitate launching the boat. Still another object resides in a novel winch that may be used selectively between either the trailer and the towing vehicle, to let out or bring in the trailer, or between the trailer and the boat to let out or bring in the boat. Of course, the dual purpose winch may be used in sequence to achieve both results.

Further objects of the invention relate to a readily removable landing wheel to increase the maneuverability of the unhitched trailer, to simplified and sturdy construction leading to low-cost manufacture and maintenance, to novel means for carrying the boat, to improved means for supporting the boat by its keel, to means for releasing and relocking the boat relative to the trailer, and to such other features and advantages as will become readily apparent from a disclosure of a preferred embodiment of the invention as detailed in the following specification and drawings, in which:

Figure 1 is a plan view of the trailer, with a carried boat shown in dot-dash lines.

Figure 2 is a side elevational view of the same.

Figure 3 is a somewhat schematic view, on a reduced scale, showing a typical use of the trailer and a vehicle.

Figure 4 is similar to Figure 3 but shows a different situation.

Figure 5 is an enlarged fragmentary section of the front portion of the hitch and release means.

Figure 6 is a partial plan view of the structure shown in Figure 5.

Figure 7 is a partial plan view of the manner of interconnecting the draft frame and wheeled axle.

Figure 8 is an enlarged transverse sectional view as seen substantially along the line 8—8 on Figure 1.

Figure 9 is a fragmentary sectional view of the winch brake.

The trailer in the preferred form thereof selected for purposes of this disclosure comprises a frame made up of a hitch frame 10 and a boat- or load-carrying frame or part 12, both of which are carried on right- and left-hand wheels 14 and 15 coaxially spaced apart and journaled on right- and left-hand spindles 16 and 17 of a dropped axle 18. (The terms "right" and "left" are used throughout with reference to the position of an observer standing behind the trailer and facing forwardly. These terms, like other expressions of location, direction, etc. are words of convenience and not of limitation.)

As best shown in Figure 7, the hitch or draft frame 10 has an elongated, central, fore-and-aft extending tubular tongue 20 pivoted on a transverse axis at 22 to a central front part of the axle 18. Right- and left-hand radius rods 24 and 25 are connected to a midportion of the tongue and diverge rearwardly to right- and left-hand pivotal connections 26 and 27 with the axle 18, the pivots 22, 26 and 27 being coaxial and all three being preferably effected by a single rod or shaft 28. Connection of the front ends of the radius rods 24 and 25 to the tongue 20 is preferably effected by welding.

The tongue 20 carries a fore-and-aft extensible and retractible element in the form of a tubular hitch part 30, the forward end of which is equipped with a coupling 32 for connection to a towing vehicle 34, such as illustrated in Figures 3 and 4. The coupling 32 may be of any suitable type, that shown being of the conventional socket type adapted to receive a ball member 36 conventionally mounted on the rear bumper of the towing vehicle 34. According to this invention, the tube or hitch part 30 is relatively long, preferably eight to ten feet, for purposes to presently appear. It is telescopically received by the tubular tongue 20 and thus is movable fore-and-aft relative to the tongue 20 between a close-coupled or retracted position (full lines in Figures 1, 2 and 3) and an extended position (dotted lines, Figure 3). It also has several intermediate positions (one of which is shown in dotted lines in Figure 2). For this purpose, a forward portion of the tongue 20 is apertured at 38 on a vertical axis, and the tube 30 has a plurality of vertical apertures in longitudinally spaced relation, the front one of which appears at 40 (Figure 5) and others of which are designated at 42 (Figures 5 and 7). Preferably, the apertures 40 and 42 are spaced apart on the order of one every two feet. The tube 30 may be selectively locked to or released from the tongue 30 by any suitable releasable means such as a pin 44. The pin may, of course, be reinserted in any alined pair of apertures 38—40 or 38—42. As a result, the fore-and-aft distance between the coupling 32 and the wheels 14 and 15 may be varied within relatively wide limits.

The load- or boat-carrying frame or part 12 includes right- and left-hand sills or side members 46 and 47, parallel at their rear portions and converging forwardly to about the front end of the tongue 20. These sills are appropriately cross-connected by bars 48 and 50 and by a deck plate 52 behind the axle 18. The frame or part is mounted on the axle by means of right- and left-hand conventional semi-elliptical springs 54 and 55, typical connectors 56 and 57, saddles 58 and 59 and shackles 60 and 61 being used at the fronts, centers and rears of the spring. Since the frame 12 is thus connected to the axle 18, and since the draft frame 10 is pivoted to the axle by the rod or shaft 28, the frame 12 may tilt a pivot relative to the draft frame 10 between a normal horizontal or load-carrying position (full lines, Figures 1, 3 and 4) and a tilted unloading and re-loading position (dotted lines Figure 1; dot-dash lines, Figure 4).

An important feature of the invention, in addition to the extensible and adjustable hitch, is the tiltablity of the frame part 12 without requiring disconnection of the trailer from the towing vehicle. This is accomplished by the pivotal relationship between the two frames 10 and 12, as outlined immediately above, plus novel release means to be presently described.

As described briefly above, the side sills 46 and 47 of the boat-carrying frame 12 converge forwardly. These sills are preferably of angle iron stock and their proximate horizontal flanges are welded together to provide what may be termed a lip 62 (Figures 5 and 6) which serves as a lock element, as will presently appear. The front portions of the sills 46 and 47 are further shown as being cross-connected by a short transverse spacer 64, which levels the frame 12 on the tongue 20.

The lip or lock element 62 lies directly behind the coupling 32 when the tube or hitch part 30 is retracted into the tongue 30. The hitch part carries at its front end, here via a rearward extension on the coupling 32, a second lock element 66 which interengages with the lip or lock element 62 by passing above the lip 62 (Figures 1, 5 and 6) when the tube is pushed into its close-coupled position. Hence, as long as the boat-carrying frame is in its horizontal or transport position and the hitch part is in its retracted or close-coupled position, the boat-carrying frame is retained against tilting by the interengaged lock elements 62–66 and this result obtains even though the hitch part 30 and tongue 20 may not be connected together by the pin 44. Since, however, the pin 44 is required as a connection if the trailer is to be towed without extending the hitch part 30, it becomes another lock element cooperative with the elements 62 and 66 to form a releasable lock means 44—62—66 functioning normally to enable towing of the shortened trailer with the boat-carrying frame held in its horizontal or carrying position.

Another feature of the invention is the provision of means in the form of a guideway or slot 68 mounted rigidly on an under forward portion of the tongue 20 and forming a transverse downwardly facing groove for removably receiving the tongued support 70 of a castering landing wheel 72. When the trailer is being transported, the wheel 72 may be carried elsewhere, as in the carried boat or in the towing vehicle. But when the trailer is disconnected, the attached wheel 72 greatly facilitates parking and maneuvering of the trailer.

A further advantage derived from the trailer design according to the invention is the winch means, designated generally by the numeral 74. Mounting for the winch is achieved by a stanchion 76, or equivalent supporting structure, at a fore part of the frame 12. This stanchion includes upright members 78 cross-connected at their tops at 80 and braced by right- and left-hand braces 82 and 83. Right- and left-hand plates 84 and 85 are rigidly secured to and extending forwardly from the stanchion 76 in transversely spaced apart relation to journal a transverse input shaft 86 and a parallel drum shaft 88. These shafts are geared together by gears 90 and 92 to provide a 2 to 1 ratio. A drum 94 keyed to the drum shaft 88 carries a suitable length of cable 96, and a combination hook 98 is secured to the free end of the cable. The free portion of the cable is reeved under a sheave 100 journaled on a cross shaft 102 carried by a support 104 rigid on a lower fore part of the frame 12 just below the winch 74 and just ahead of the stanchion 76. A crank handle 106 is provided for manually operating the winch.

In order that the speed of the winch may be controlled when the trailer is being let out from an anchor point to which the hook 98 of the cable may be attached, the input shaft has brake means (Figure 9) comprising a band 108 anchored at one end to a cross member 110 between the plates 84 and 85, wrapped around the shaft 88 and relaxed and tightened by a hand wheel and screw 112 threaded into a bore in the cross member 110.

A representative boat is shown in dot-dash lines in Figures 1, 2 and 8 and in full lines in Figures 3 and 4, being designated generally by the numeral 114. For purposes of mounting or carrying the boat, and also to facilitate launching of the boat, the frame 12 has a longitudinal central track or keel guide 116 comprising right- and left-hand angles 118 and 119 between which are journaled a plurality of rollers 120. The rear ends of the track angles are spread apart at 122 and 123 and carry a longer roller 124. The keel 126 of the boat rides on these rollers and readily slides onto and off of the track. The spread of the track at 122 and 123 facilitates centering of the keel in re-loading.

The stanchion 76 has a curved member 128, preferably of wood to minimize marring the prow of the boat, disposed between the stanchion braces 82 and 83. The top of the stanchion may be equipped with rubber blocks (not shown) to cushion the contact with the prow. An eye 130, which is conventionally part of the prow of the boat, projects through an opening (not shown) at the top of the stanchion and receives a retaining pin 132 (Figure 2). The eye 130 also serves for connection of the cable 96 or for any conventional purpose.

In addition to the keel track 116, the trailer has, on the carrying frame 12, a saddle made up of right- and left-hand blocks 134 and 135 (Figures 1, 2 and 8), each of which may be appropriately padded and covered with fabric. The saddle blocks fit and support the boat at about its widest part. Hence, when the boat is launched it would be supported only on its keel via the keel track 116. To avoid any disadvantages in this respect, the deck plate 52 has pivoted thereon, at 136 and 137, right- and left-hand guides 138 and 139 comprising brackets 140 and 141 and rollers 142 and 143. The brackets are backed up by springs, only one of which appears at 145 in Figures 2 and 8. When the boat is carried, it does not engage the rollers, but as it rocks during launching it engages and is stabilized by these rollers.

In use, the trailer is easily towed behind a vehicle, as suggested in full lines in Figure 3. The boat is securely mounted by the connection at 130—132 to the stanchion 76 and its basis on the keel track 116. Additional tie-down means may be used if desired or required, but these form no part of the present invention. The hook 98 of the cable 96 may be temporarily hooked onto any part of the trailer, since the winch is not used in merely transporting the boat.

One of the most significant advantages of the herein disclosed trailer is its pronounced maneuverability in otherwise inaccessible places. For example, the trailer, with its draft frame in close-coupled relation (in which it is normally transported) is shown in full lines as having been backed by the towing vehicle onto a stretch of soft sand S or other ground on which the towing vehicle would fail to obtain flotation or traction. The vehicle must thus remain on solid ground G; yet, the water W is far from near enough to permit launching of the boat. But this is not an insurmountable difficulty according to the present invention. As a matter of fact, it is one of the simplest. All that is required is release of the hitch tube 30 from the tongue 20, which is accomplished simply by removing the pin 44 and leaving the coupling 32 connected to the vehicle 34. The vehicle is driven ahead to the dotted line position (Figure 3), which will extend the tube 30, since there will be sufficient ground resistance to hold the trailer. Then, the pin 44 is replaced through the tongue aperture 38 and an appropriate one of the apertures 42 in the tube 30. This maneuver will add enough footing to enable the vehicle and trailer to be backed until the trailer is at the beach while the vehicle remains on solid ground.

Since removal of the pin 44 and extension of the hitch frees the lip 62 on the carrying frame 12 from the cooperating lip 66 on the coupling 32, the carrying frame is now free to be tilted about its pivot 28 relative to the draft frame 10. This pivoting will not, however, occur automatically because the greater proportion of the weight of the carrying frame and boat is ahead of the pivot. But the unbalance is not so great as to preclude easy manual lifting of the loaded carrying frame, and the boat will slide readily down the ramp thus provided, the retainer or pin 132 having been first removed to disconnect the eye 130 on the prow of the boat from the stanchion 76.

The user may readily control the tilt of the carrying frame by tightening the winch brake and hooking the cable to some part of the draft frame, thus establishing a limit on the angle of tilt. Or he may unreeve the cable 96 from the sheave 100 and hook it into the prow eye 130 after removing the retainer 132 and backing the boat away from the stanchion. With the winch brake tightened to the desired degree, launching may be controlled.

In the event that the water is too shallow for launching, the trailer may be backed part way into the water, either by the vehicle 34, if the footing is satisfactory, or manually, in which latter case the coupling 32 is disconnected from the vehicle 34 and the extended hitch provides additional leverage and the added landing wheel 72 increases the ease with which this otherwise onerous task may be performed.

In the situation shown in Figure 4, the vehicle 34 has been backed as far as possible on a level L from which a bank B drops sharply to a flat F. Because of the difference in levels between L and F, it is impossible to have the vehicle and trailer connected at 32—36, whether for launching or re-loading the boat. In cases of this kind the dual function of the winch 74 is important. For example, in moving the trailer to its illustrated position, the vehicle 34 will have been backed as far as possible before the trailer is disconnected. Extension of the hitch as in Figure 3 may be utilized. If the slope at B requires, the winch 74 may be connected to the hitch ball 36 via the cable 96 and hook 98 and the winch brake adjusted to let the trailer down the slope, the landing wheel 72 having been attached to facilitate the task. The boat may then be launched by tilting the carrying frame 12 (dot-dash lines). In retrieving the boat, the cable is disconnected from 36, unreeled from the sheave 100 and payed out for connection to the prow eye 130. The boat may then be drawn in to and up the tilted carrying frame 12 and relocked. Then the cable may be again reeved under the sheave 132 and again connected to the vehicle so that the loaded trailer may be pulled up the bank B either manually by operation of the winch or through power by driving the vehicle ahead, after which direct connection of the trailer to the vehicle may be effected. If necessary, the boat may be winched in to the trailer over relatively great distances and the trailer may likewise be winched in to or out from the parked vehicle, depending upon the length of the cable 96 and the availability of suitable trees, piles and other anchor points for the cable hook 96. As shown in Figure 4, the vehicle 34 serves at times as such anchor point and for that reason the hook 98 is of the combination type, including the hook part as well as an enlarged eye capable of easily fitting a hitch ball such as 36.

The principal overall advantage of the invention is the marked flexibility afforded by the combination of the dual-function winch, the extensible and adjustable draft frame, the tilting carrying frame and the removable landing wheel. Any or all of these can be used, depending upon the situation.

Boat trailers of types heretofore known, although highly capable in transport and in reaching fairly convenient places, are handicapped by lack of maneuverability in situations of the kind outlined above. In order to increase his enjoyment in fishing relatively wild lakes, the average user would purchase a small boat, which he could readily mount on the roof of his automobile and one which he could easily carry through woods, swamps, etc. However, the danger of capsizing in a small boat is disproportionately greater than in a larger boat. Hence, the increased flexibility in maneuvering that characterizes the trailer design of the present invention makes it possible to take larger boats in otherwise impossible places, thus not only adding to the user's enjoyment but substantially eliminating the hazards of capsizing.

Features and advantages of the invention in addition to those enumerated and outlined will readily occur from the foregoing description and drawings, as also will various modifications and alterations in the preferred embodiment of the invention disclosed, all of which may be attained without departing from the spirit and scope of the invention.

What is claimed is:

1. A trailer, comprising: a draft frame having a forwardly extending tongue; a hitch part having a front end adapted for connection to a towing vehicle and having its rear portion telescopically interconnected with the tongue for selectively fore-and-aft extension and retraction relative to the tongue; means cooperative between the hitch part and tongue for locking the two together in a close-coupled position, said means being releasable to permit forward extension of the hitch part; a load-carrying part tiltable on the draft frame about a transverse axis between load-carrying and tilted positions and having a first lock element thereon at a front portion thereof; and a second lock element fixed to and movable with the hitch part and engaging the first lock element when the load-carrying and hitch parts are respectively in their load-carrying and close-coupled positions, said elements being disengageable upon forward extension of the hitch part after release of the aforesaid releasable means.

2. The invention defined in claim 1, in which: the tongue and hitch parts respectively have a pair of cooperating portions receiving the releasable means in the close-coupled position of the hitch part; and the tongue and hitch part respectively have additional portions for cooperating with the releasable means to re-connect the tongue and hitch part in intermediate extended positions of the hitch part.

3. The invention defined in claim 2, in which: the first and second lock elements are arranged to be disengaged substantially immediately upon relatively slight extension of the hitch part and to remain disengaged while the hitch part and tongue are reconnected in said intermediate positions.

4. A trailer, comprising: a draft frame; a load-carrying part mounted on the draft frame for tilting relative to said draft frame between load-carrying and tilted positions; a hitch part adapted to be connected to a towing vehicle and connected to the draft frame for selective fore-and-aft movement relative to the draft frame between extended and retracted positions; and releasable lock means simultaneously cooperative between the hitch part, the load-carrying part and the draft frame and operative in a normal position for simultaneously locking the hitch part in its retracted position and the load-carrying part in its load-carrying position and movable out of said position for releasing the hitch and load-carrying parts respectively for extension and tilting.

5. The invention defined in claim 4, in which: the draft frame has a forwardly extending tongue part and the connection of the hitch part to the draft frame is effected via said tongue part; and the lock means comprises a first lock element on the load-carrying part positioned adjacent to the tongue part when said load-carrying part is in its load-carrying position, a second lock element on the hitch part engaging said first lock part when the hitch part is in retracted position, and a third lock element releasably locking the hitch and tongue parts to hold the hitch part against extension and to simultaneously maintain engagement of the second lock element with the first lock element.

6. A trailer, comprising: a draft frame; a load-carrying part mounted on the draft frame for tilting relative to said draft frame between load-carrying and tilted positions; a hitch part adapted to be connected to a towing vehicle and connected to the draft frame for selective fore-and-aft movement relative to the draft frame between extended and retracted positions; and releasable lock means cooperative between the hitch part and draft frame for locking the hitch part in its retracted position, said means including an element cooperative with the load-carrying part and operative when the hitch part is in its retracted position for releasably locking said load-carrying part in its load-carrying position and operative automatically upon extension of the hitch part to release the load-carrying part for tilting.

7. A trailer, comprising: a draft frame; a load-carrying part mounted on the draft frame for tilting relative to said draft frame between load-carrying and tilted positions; a hitch part adapted to be connected to a towing vehicle and connected to the draft frame for selective fore-and-aft movement relative to the draft frame between extended and retracted positions; releasable means associated with the hitch part for retaining the hitch part in its retracted positions; and means associated with the first releasable means and the load-carrying part for normally retaining the load-carrying part in its load-carrying position and responsive to extension of the hitch part for conditioning said load-carrying part for tilting.

8. A boat trailer, comprising: a fore-and-aft extending draft frame having hitch means at its foreward end for connection to a towing vehicle, said hitch means including telescopically arranged members and a releasable lock therefore for selectively increasing and shortening the fore-and-aft length of the hitch means; a boat-carrying frame extending fore and aft and mounted on the draft frame on a transverse horizontal axis rearwardly of the hitch means for tilting from a normally generally horizontal boat-carrying position to a downwardly and rearwardly tilted ramp position for loading and unloading a boat; releasable means cooperative between the draft frame and the boat-carrying frame for selectively retaining the boat-carrying frame in and releasing the boat-carrying frame from its boat-carrying position; and means cooperative between the releasable means and the hitch means for releasing said releasable means upon increase in length of the hitch means.

9. A boat trailer, comprising: a mobile main frame having coupling means at a forward portion thereof for connection to a draft vehicle; a fore-and-aft extending boat-carrying part superposed on the main frame; means mounting the boat-carrying part on the main frame for tilting of the boat-carrying part relative to the main frame about a transverse axis between a horizontal boat-carrying position and a rearwardly tilted boat-unloading position; fore-and-aft extending track means centrally of and on the boat-carrying part for receiving the keel of a boat; a pair of boat-mounting pads on and intermediate the ends of the boat-carrying part, one at each side of the track means and at a level higher than the track means for engaging the bottom of such boat and combining with the track means to support a boat when the boat carrying part is in its horizontal position; and a pair of stabilizing rollers carried by the boat-carrying part to the rear of the mounting pads, one at each side of the track means for engaging the bottom of such boat when the boat-carrying part is tilted to its unloading position to discharge the boat, said stabilizer rollers being yieldable downwardly to conform to the changing contour of the bottom of the boat as the boat moves off of the boat-carrying part.

10. A boat trailer of the character described, comprising: a fore-and-aft main frame having front and rear ends; a single pair of laterally spaced coaxial main wheels disposed in rearwardly spaced relation to said front end and sustaining the frame in an unstable relation in which said front end tends to move downwardly about the wheels as an axis; draft means on the front end of the frame for releasable connection to and support by a towing vehicle to combine with the wheels in stably supporting the frame in a substantially horizontal position; a normally horizontally positioned boat carrying part carried by the frame for rearward and upward tilting relative to the frame while the frame remains substantially horizontal whereby to launch a boat carried by said part; means releasably holding said part against tilting; and a landing wheel removably mounted on and beneath the front end of the main frame for sustaining the front end of the frame when the draft means is disconnected from the towing vehicle, said landing and main wheels combining to sustain the entire trailer for mobility and maneuverability with the boat-carrying part in either of its normal or tilted positions.

11. The invention defined in claim 10, in which: the front end of the frame has thereon a substantially horizontal mounting member including a downwardly facing guideway open at its bottom and at least at one end; the landing wheel is a caster wheel and includes an upright castering spindle and an upright coaxial bearing journaling said spindle, and said bearing includes a substantially horizontal tongue portion slidably receivable in and removable from the guideway, said caster wheel when loaded being effective to caster and thereby to exert forces on the tongue and guideway sufficient to retain the tongue in said guideway.

References Cited in the file of this patent

UNITED STATES PATENTS

| | | |
|---|---|---|
| 1,840,435 | Davis | Jan. 12, 1932 |
| 1,870,573 | Kuchar | Aug. 9, 1932 |
| 2,405,810 | Berg et al. | Aug. 13, 1946 |
| 2,407,993 | McKee | Sept. 24, 1946 |
| 2,485,793 | Vassar | Oct. 25, 1949 |
| 2,550,230 | Dalton | Apr. 24, 1951 |
| 2,557,203 | Rehberger | June 19, 1951 |
| 2,583,557 | Foy | Jan. 29, 1952 |
| 2,586,485 | Schroeder | Feb. 19, 1952 |
| 2,650,730 | Rohm | Sept. 1, 1953 |

FOREIGN PATENTS

| | | |
|---|---|---|
| 372,172 | Great Britain | May 5, 1932 |